US011364952B2

(12) United States Patent
Kim

(10) Patent No.: US 11,364,952 B2
(45) Date of Patent: Jun. 21, 2022

(54) SYSTEM FOR RECOGNIZING TRAILER OF VEHICLE AND METHOD THEREOF

(71) Applicants: HYUNDAI MOTOR COMPANY, Seoul (KR); KIA MOTORS CORPORATION, Seoul (KR)

(72) Inventor: Hyun Su Kim, Uiwang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 354 days.

(21) Appl. No.: 16/540,729

(22) Filed: Aug. 14, 2019

(65) Prior Publication Data

US 2020/0331527 A1  Oct. 22, 2020

(30) Foreign Application Priority Data

Apr. 22, 2019  (KR) .................. 10-2019-0046761

(51) Int. Cl.
*B62D 13/00* (2006.01)
*B62D 15/02* (2006.01)
*G01S 15/931* (2020.01)

(52) U.S. Cl.
CPC ......... *B62D 13/005* (2013.01); *B62D 15/021* (2013.01); *G01S 15/931* (2013.01); *G01S 2015/938* (2013.01)

(58) Field of Classification Search
CPC ... B62D 13/005; B62D 15/021; G01S 15/931; G01S 2015/938
See application file for complete search history.

(56) References Cited

U.S. PATENT DOCUMENTS

| 9,683,848 | B2* | 6/2017 | Lavoie ............ B60W 30/18036 |
| 10,112,647 | B2* | 10/2018 | Muharemovic ........ B62D 13/06 |
| 2014/0267688 | A1* | 9/2014 | Aich ................. B60W 50/0097 348/113 |
| 2018/0127024 | A1* | 5/2018 | Pourrezaei Khaligh ..................... B62D 15/021 |
| 2019/0126851 | A1* | 5/2019 | Greenwood .......... G06T 3/4038 |

FOREIGN PATENT DOCUMENTS

| KR | 20-1997-0031269 U | 7/1997 |
| KR | 10-0762697 B | 10/2007 |

* cited by examiner

*Primary Examiner* — Peter D Nolan
*Assistant Examiner* — Demetra R Smith-Stewart
(74) *Attorney, Agent, or Firm* — Morgan, Lewis & Bockius LLP

(57) ABSTRACT

A trailer recognition device of a vehicle includes: a sensor sensing a distance value between the vehicle and a rear object; a controller detecting whether a trailer is connected, depending on an internal signal of the vehicle and the distance value and predicting a first hitch angle based on a vehicle model and a second hitch angle based on the sensor to generate a control signal; and a trailer mode controller controlling a trailer mode of the vehicle in response to the control signal.

19 Claims, 15 Drawing Sheets

SYSTEM FOR RECOGNIZING TRAILER OF VEHICLE AND METHOD THEREOF

CROSS-REFERENCE TO RELATED APPLICATION

This application claims the benefit of priority to Korean Patent Application No. 10-2019-0046761, filed in the Korean Intellectual Property Office on Apr. 22, 2019, the entire contents of which are incorporated herein by reference.

TECHNICAL FIELD

The present disclosure relates to a trailer recognizing device of a vehicle and a method thereof, and more particularly, to a technology for recognizing a trailer by using an ultrasonic sensor in a vehicle to which the trailer is coupled.

BACKGROUND

Generally, various service devices for safety and convenience may be installed in a vehicle to prevent safety accidents of a driver. A rear sensor of these vehicle devices may notify a distance from a rear obstacle with a voice or a text and then may allow the driver moving backwards to easily recognize the distance from the rear obstacle.

Because there is no need for the driver to recognize the distance via a separate display device, the rear detection system of the vehicle may reduce the risk of accidents. Accordingly, the rear detection system has recently been installed in vehicles.

However, because a rear sensor recognizes that the mounted trailer is an obstacle at the rear of a vehicle, a conventional rear detection system of a vehicle may fail to perform the function of the rear sensor, when a trailer or the like is mounted at the rear of a vehicle. Accordingly, the driver may become uncomfortable.

SUMMARY

The present disclosure has been made to solve the above-mentioned problems occurring in the prior art while advantages achieved by the prior art are maintained intact.

An aspect of the present disclosure provides a trailer recognizing device of a vehicle that recognizes a trailer through the prediction of a hitch angle of a vehicle model and a hitch angle of an ultrasonic sensor to actively determine whether a trailer is mounted, and a method thereof.

The technical problems to be solved by the present disclosure are not limited to the aforementioned problems, and any other technical problems not mentioned herein will be clearly understood from the following description by those skilled in the art to which the present disclosure pertains.

According to an exemplary embodiment of the present disclosure, a trailer recognizing device of a vehicle includes: a sensor sensing a distance value between the vehicle and a rear object; a controller detecting whether a trailer is connected, depending on an internal signal of the vehicle and the distance value and predicting a first hitch angle based on a vehicle model and a second hitch angle based on the sensor to generate a control signal; and a trailer mode controller controlling a trailer mode of the vehicle in response to the control signal.

According to another exemplary embodiment of the present disclosure, a trailer recognizing method of a vehicle includes: receiving a distance value from a sensor in a go-straight state of the vehicle to determine whether an object is detected at a rear side of the vehicle; predicting a first hitch angle based on a vehicle model and predicting a second hitch angle based on the distance value of the sensor; matching the first hitch angle with the second hitch angle to determine whether the trailer is connected; and controlling a trailer mode of the vehicle, when it is determined that the trailer is connected.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to accompanying drawings.

Figure 1:
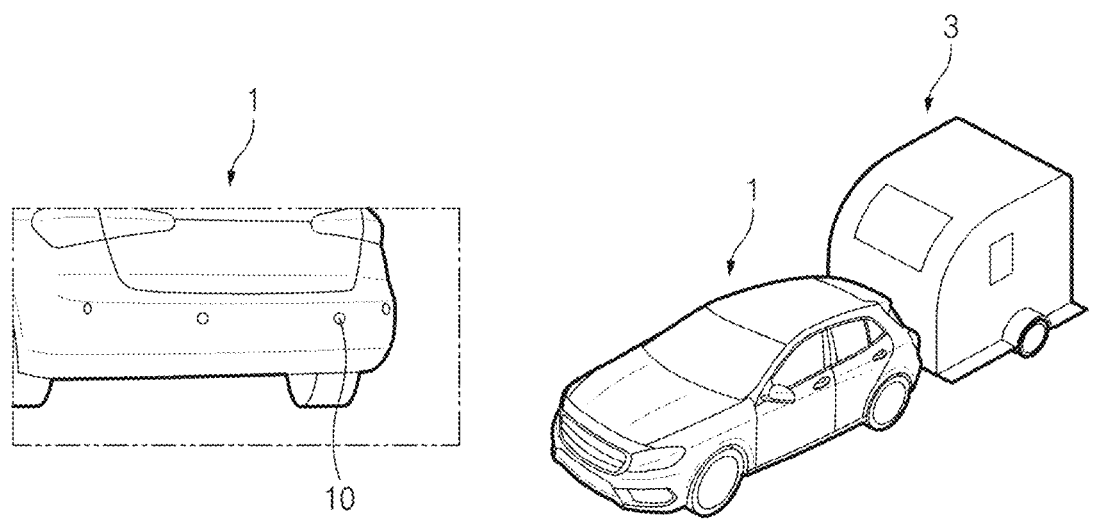
FIG. 1 is a system configuration diagram illustrating a vehicle and a trailer, according to an exemplary embodiment of the present disclosure.

FIG. 1 is a system configuration diagram illustrating a vehicle and a trailer, according to an exemplary embodiment of the present disclosure.

Referring to FIG. 1, in an exemplary embodiment of the present disclosure, a trailer 3 may be mounted at a rear side of a vehicle 1. The vehicle 1 includes a sensor 10 (for example, ultrasonic sensor) at the rear side to recognize whether the trailer 3 is connected.

An embodiment of the present disclosure is exemplified as four ultrasonic sensors 10 are included in the rear side of the vehicle 1 at specific intervals. However, the number of ultrasonic sensors 10 included in the vehicle 1 is not limited thereto. An exemplary embodiment of the present disclosure may include the sensor 10 which comprises an ultrasonic sensor. However, a type of sensor is not limited thereto.

In the present disclosure, the trailer 3 connected to the rear side of the vehicle 1 may be recognized actively. As such, in the embodiment of the present disclosure, even though a driver does not enter a separate mode, it is possible to activate the control functions of a vehicle associated with whether the trailer 3 is mounted, thereby providing the driver with convenience and stability.

Figure 2:
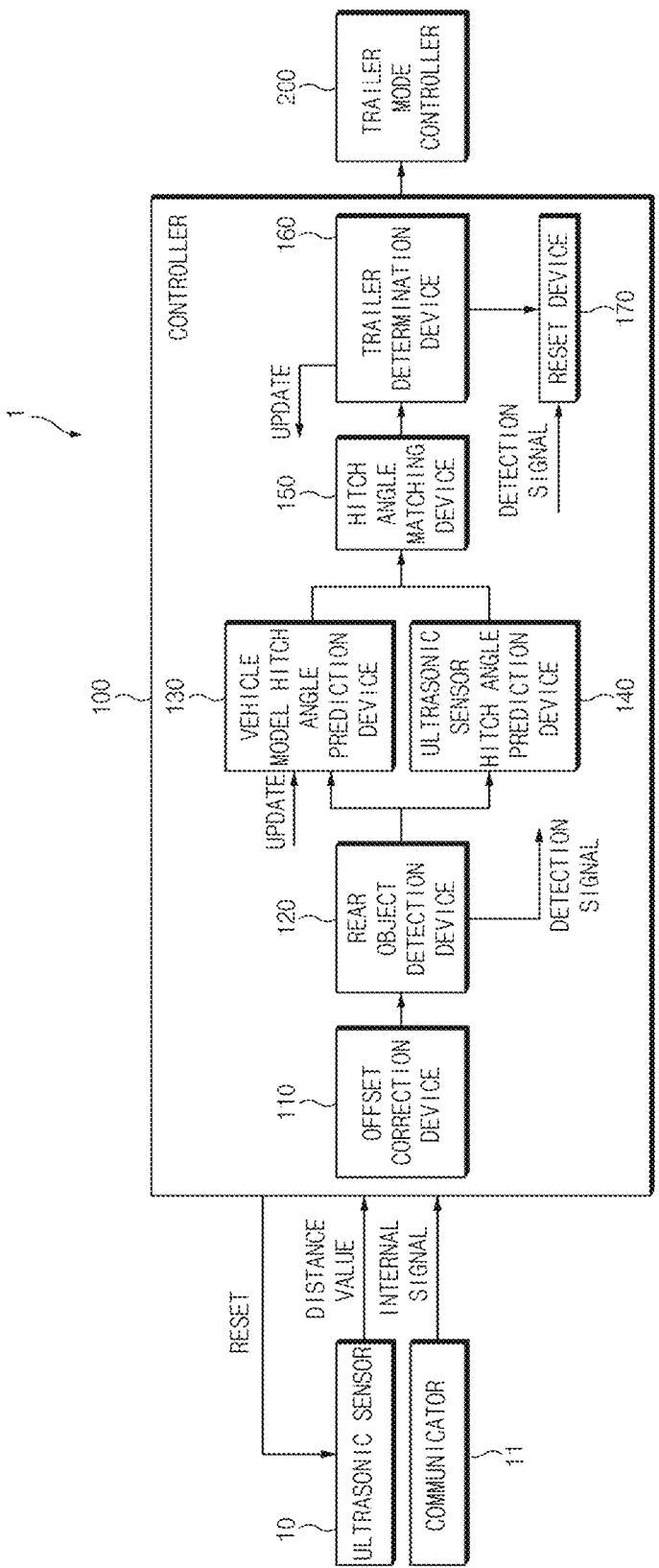
FIG. 2 is a block diagram of a trailer recognizing device of a vehicle, according to an exemplary embodiment of the present disclosure.

FIG. 2 is a block diagram of a trailer recognizing device of a vehicle, according to an exemplary embodiment of the present disclosure.

Referring to FIG. 2, according to an exemplary embodiment of the present disclosure, the vehicle 1 may include the ultrasonic sensor 10, a communicator 11, a controller 100, and a trailer mode controller 200. The controller 100 may include an offset correction device 110, a rear object detection device 120, a vehicle model hitch angle prediction device 130, a sensor hitch angle prediction device 140 (for example, ultrasonic sensor hitch angle prediction device), a hitch angle matching device 150, a trailer determination device 160, and a reset device 170.

Herein, the ultrasonic sensor 10 may sense a distance between the vehicle 1 and a rear object, using an ultrasonic wave. Moreover, the communicator 11 may receive an internal signal of the vehicle 1 to transmit the internal signal of the vehicle 1 to the controller 100.

For example, the communicator 11 may receive the internal signal of the vehicle 1 via a Controller Area Network (CAN) bus to transmit the internal signal of the vehicle 1 to the controller 100. The internal signal of the vehicle 1 received from the communicator 11 is a signal for determining the state of the vehicle 1 such as a vehicle speed, a steering angle, a yaw rate (a rotational angular velocity), or the like.

Furthermore, the controller 100 may receive a distance value to a rear object, from the ultrasonic sensor 10 and may receive the internal signal from the communicator 11. The controller 100 may generate a control signal depending on the value of the distance to the rear object and the internal signal and may transmit the control signal to the trailer mode controller 200.

Herein, the controller 100 may be hardware such as a processor (e.g, Electronic Control Unit (ECU) or Micro Control Unit (MCU)), may be software executed by the hardware, or may be the aggregation from combining the hardware and the software.

In some embodiments, the controller 100 may control the functions of the offset correction device 110, the rear object detection device 120, the vehicle model hitch angle prediction device 130, the sensor hitch angle prediction device 140, the hitch angle matching device 150, the trailer determination device 160, and the reset device 170. Alternatively, the controller 100 may include the offset correction device 110, the rear object detection device 120, the vehicle model hitch angle prediction device 130, the sensor hitch angle prediction device 140, the hitch angle matching device 150, the trailer determination device 160, and the reset device 170 embedded therein.

The offset correction device 110 may receive the internal signal from the communicator 11 to correct a yaw rate. The offset correction device 110 determines a state where the vehicle 1 is stopped or goes straight.

Moreover, the rear object detection device 120 detects whether there is an object at the rear of the vehicle 1, depending on the distance value from the rear object sensed from the ultrasonic sensor 10 and the output signal of the offset correction device 110. For example, the rear object detection device 120 may receive the distance value from the ultrasonic sensor 10, when it is determined by the offset correction device 110 that the vehicle 1 goes straight.

The vehicle model hitch angle prediction device 130 predicts a vehicle model-based trailer hitch angle in response to the internal signal and the output signal of the rear object detection device 120. Furthermore, the ultrasonic sensor hitch angle prediction device 140 predicts a trailer hitch angle based on the ultrasonic sensor 10, depending on the distance value and the output signal of the rear object detection device 120.

The hitch angle matching device 150 matches two prediction values, which are applied from the vehicle model hitch angle prediction device 130 and the ultrasonic sensor hitch angle prediction device 140, with each other. The trailer determination device 160 determines whether the trailer 3 is connected to the vehicle 1, in response to the output of the hitch angle matching device 150.

The reset device 170 controls whether to reset the ultrasonic sensor 10, in response to the output of the trailer determination device 160. That is, the reset device 170 may turn off the ultrasonic sensor 10, when it is finally determined by the trailer determination device 160 that the trailer 3 is connected.

In addition, the reset device 170 controls whether to reset the ultrasonic sensor 10 and the controller 100, during the parking of the vehicle 1 and the ignition on/off in response to the output of the trailer determination device 160. For example, the reset device 170 may control the ultrasonic sensor 10 to be turned off, when the vehicle 1 is parked or when the ignition is turned on/off.

Moreover, the reset device 170 may receive the detection result of the rear object detection device 120. That is, the reset device 170 may turn off the ultrasonic sensor 10 to allow the ultrasonic sensor 10 not to operate unnecessarily, when a rear object is not detected by the rear object detection device 120.

The trailer mode controller 200 controls the trailer mode of the vehicle 1 in response to the output signal of the trailer determination device 160.

For example, the trailer mode controller 200 may control Advanced Driver Assistance System (ADAS) and electronic stability controller (ESC) that actively controls braking power to stabilize the vehicle, or the like, using a signal detected by the controller 100. That is, the trailer mode controller 200 may adjust a point in time when ADAS, ESC, or the like is operated and the degree of control, depending on information detected by the controller 100. In another embodiment, the trailer mode controller 200 may block the excessive warning sound (rear anti-collision warning sound) at rear parking, when it is detected that the trailer 3 is mounted in the vehicle 1.

An embodiment is exemplified in FIG. 2 as the trailer mode controller 200 is separately included in the outside of the controller 100. However, an embodiment of the present disclosure is not limited thereto. The trailer mode controller 200 may be included in the controller 100.

A general vehicle requires a separate angle detection sensor to measure the hitch angle between a rear trailer and a tow vehicle. However, in an embodiment of the present disclosure, whether the trailer 3 is mounted may be actively determined using the parking assistance ultrasonic sensor 10 mounted at the rear of the vehicle 1. In addition, in an embodiment of the present disclosure, the trailer mode may be controlled by estimating the hitch angle without a separate angle detection sensor and by estimating the wheelbase of the trailer 3.

Figure 3:
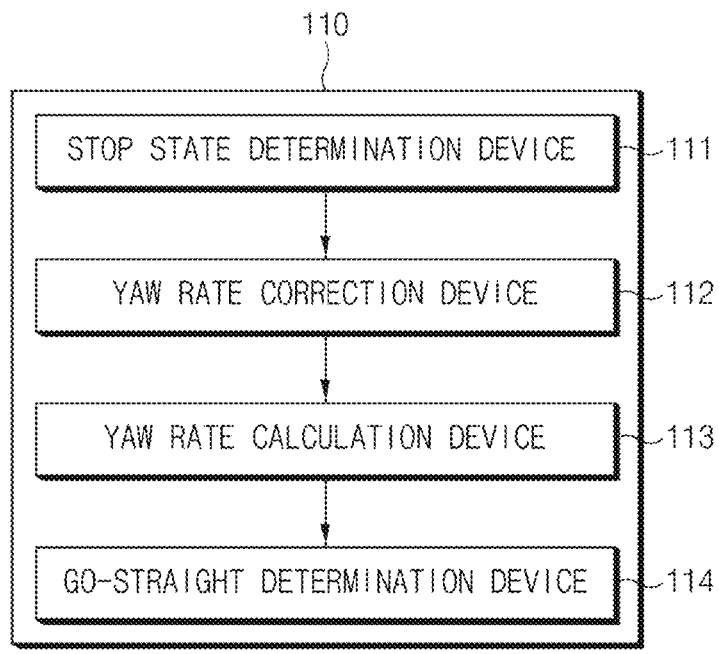
FIG. 3 is a detailed block diagram of an offset correction device of FIG. 2.

FIG. 3 is a detailed block diagram of the offset correction device 110 of FIG. 2.

Referring to FIG. 3, the offset correction device 110 may include a stop state determination device 111, a yaw rate correction device 112, a yaw rate calculation device 113, and a go-straight determination device 114.

Herein, the stop state determination device 111 determines the stop state of the vehicle 1 in response to the internal signal applied from the communicator 11. That is, the stop state determination device 111 receives a vehicle speed in the internal signal and then determines that the vehicle 1 is in a stop state, when the vehicle speed is not greater than a specific speed.

Moreover, the yaw rate correction device 112 may correct a yaw rate depending on the determination result of the stop state determination device 111. That is, the yaw rate correction device 112 defines a yaw rate value at a point in time when the vehicle 1 is in a stop state, as a yaw rate offset. The yaw rate correction device 112 may correct the yaw rate by subtracting the yaw rate offset, when the vehicle 1 is in a stop state.

The yaw rate calculation device 113 calculates the yaw rate based on a vehicle model (Bicycle model). The yaw rate calculation device 113 may calculate a current yaw rate from a two-degree-of-freedom vehicle model.

The go-straight determination device 114 determines the go-straight state of the vehicle 1. For example, the go-straight determination device 114 compares the yaw rate value corrected by the yaw rate correction device 112 with the yaw rate value calculated by the yaw rate calculation device 113. The go-straight determination device 114 determines that the vehicle 1 is in a go-straight state, when both two yaw rate values are within a specific value. In addition, the controller 100 turns on the ultrasonic sensor 10 to receive a distance value, when it is determined that the vehicle 1 is in a go-straight state.

Figure 4:
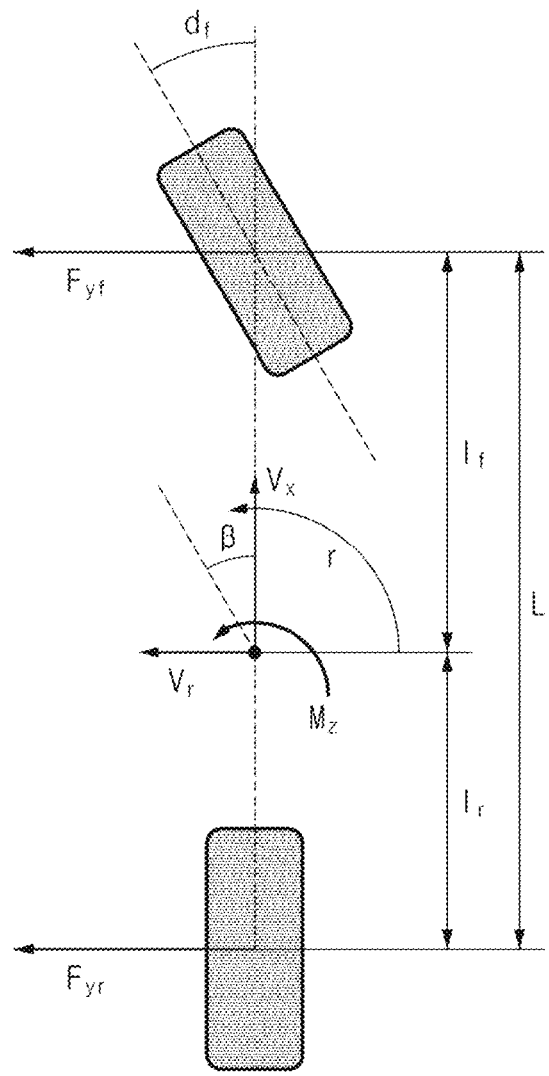
FIG. 4 is a view for describing a yaw rate calculation device of FIG. 3.

FIG. 4 is a view in which a vehicle model is simplified in the yaw rate calculation device 113 of FIG. 3.

Referring to FIG. 4, $F_{yf}$ denotes the lateral force change with respect to the front wheel of a vehicle; $F_{yr}$ denotes the lateral force change with respect to the rear wheel of a vehicle; $V_x$ denotes a vehicle speed; 'r' denotes a yaw rate; $d_f$ denotes the front wheel steering angle; $I_f$ denotes the longitudinal distance from the center of mass of the vehicle to the center of the front wheel; $I_r$ denotes the longitudinal distance from the center of mass of the vehicle to the center of the rear wheel; $V_r$ denotes the wheel location speed; $M_z$ denotes the yaw rate change; 'B' denotes the side slip angle; 'L' denotes the longitudinal distance from the center of the front wheel to the center of the rear wheel.

The yaw rate calculation device 113 is based on the two-degree-of-freedom vehicle model illustrated in FIG. 4 and calculates the current yaw rate by using following Equation 1.

$$\begin{bmatrix} \dot{\beta} \\ \dot{r} \end{bmatrix} = \begin{bmatrix} -\frac{2(C_f + C_r)}{m} & -1 - \frac{2(I_f C_f - I_r C_r)}{mv_x^2} \\ -\frac{2(I_f C_f I_r C_r)}{I_z} & -\frac{2(I_f^2 C_f + I_r^2 C_r)}{I_z v_x} \end{bmatrix} \begin{bmatrix} \beta \\ r \end{bmatrix} + \begin{bmatrix} \frac{2C_f}{mv_x} \\ \frac{2C_f I_f}{I_z} \end{bmatrix} \delta_f \quad \text{[Equation 1]}$$

In above Equation 1, 'B' denotes the side slip angle; 'r' denotes a yaw rate value; 'm' denotes vehicle mass; $V_x$ denotes a vehicle speed; $C_f$ denotes front wheel cornering stiffness; $C_r$ denotes rear wheel cornering stiffness; $I_f$ denotes the distance between the center of mass of a vehicle and the front axle; $I_r$ denotes the distance between the center of mass of a vehicle and the rear axle; $I_z$ denotes vehicle inertia in the z-axis direction (the vertical axis on the driving plane of a vehicle); $\delta_f$ denotes a steering angle. In Equation 1, the vehicle speed $V_x$ may be input from the communicator 11, and the remaining parameters may be determined in advance depending on the characteristics of a vehicle.

Figure 5:
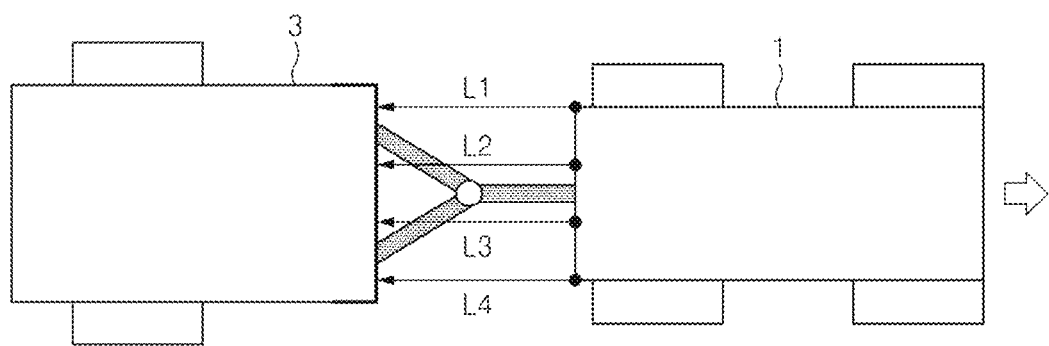
FIG. 5 is a view for describing a rear object detection device of FIG. 2.

FIG. 5 is a view for describing the rear object detection device 120 of FIG. 2.

Referring to FIG. 5, the rear object detection device 120 receives distance values from a rear object, from the ultrasonic sensor 10. Herein, each of the distance values received from the ultrasonic sensor 10 may be expressed as L1 to L4. Moreover, the rear object detection device 120 may output a detection signal indicating whether there is a rear object, and the layout distance TL of the trailer 3.

The rear object detection device 120 detects the rear object depending on each of the received distance values L1 to L4. For example, the rear object detection device 120 determines whether the difference between the previously measured distance value and the distance value L1, L2, L3, or L4 received from the ultrasonic sensor 10 is maintained less than or equal to a specific value.

The rear object detection device 120 averages the received distance values L1 to L4, when the difference of the distance value is maintained less than or equal to the specific value. The rear object detection device 120 may set the averaged distance value to the distance TL of the layout of the trailer 3.

Figure 6:
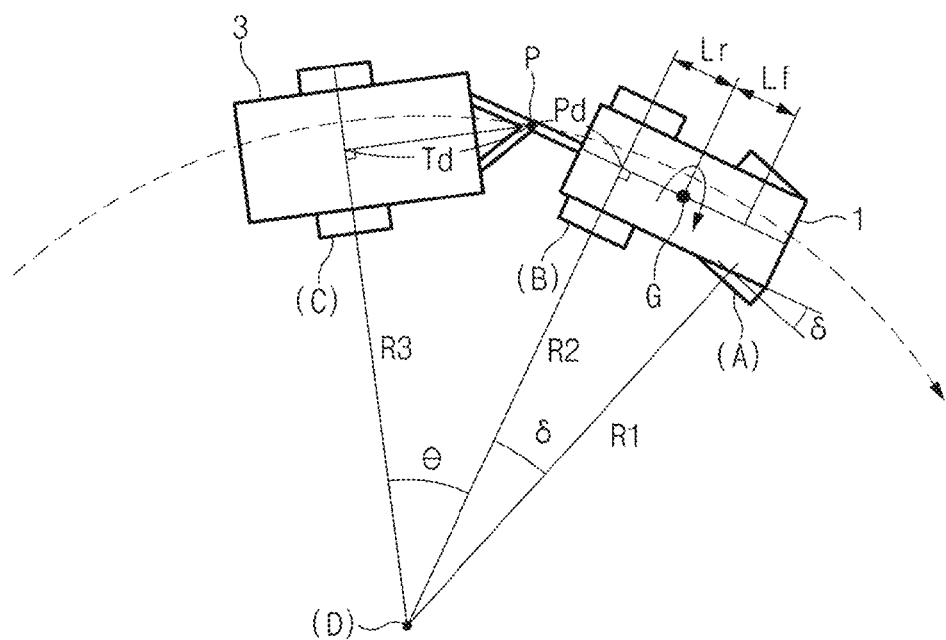
FIG. 6 is a view for describing a vehicle model hitch angle prediction device of FIG. 2.

FIG. 6 is a view for describing the vehicle model hitch angle prediction device 130 of FIG. 2.

Referring to FIG. 6, the vehicle model hitch angle prediction device 130 predicts the angle (hitch angle) between the trailer 3 and the vehicle 1, based on a vehicle model.

The vehicle model hitch angle prediction device 130 predicts the radius of turn of the vehicle 1, based on the vehicle model. For example, the vehicle model hitch angle prediction device 130 may predict the radius of turn of the vehicle 1, using a kinematic vehicle model.

An embodiment of the present disclosure is exemplified as the vehicle model hitch angle prediction device 130 predicts the radius of turn by using the kinematic vehicle model. However, an embodiment of the present disclosure is not limited thereto. The vehicle model hitch angle prediction device 130 may predict the path of turn of a control vehicle, based on at least one of a yaw rate sensor, a steering angle speed, a wheel speed.

In the kinematic vehicle model, R1 denotes the distance from the center point D to the vehicle front wheel axis A; R2 denotes the distance from the center point D to the vehicle rear wheel axis B; R3 denotes the distance from the center point D to the wheel axis C of the trailer 3. Moreover, the angle between R1 and R2 is expressed as 'δ', and the angle (hitch angle) between R2 and R3 is expressed as 'θ'.

The vehicle model hitch angle prediction device 130 may predict the radius of turn of the vehicle 1, using Equation 1 below.

$$R2 = \frac{L_f + L_r}{\tan^{-1} \delta} \quad \text{[Equation 2]}$$

In Equation 2 above, δ denotes steering angle; $L_f$ denotes the distance between the center of mass G and the front wheel axis A; $L_r$ denotes the distance between the center of mass G and the rear wheel axis B. The value R2 may be obtained by calculating a steering angle δ of the vehicle 1 and the value of the distance $L_f$ or $L_r$ between the center of mass G and the front/rear wheel axis.

Furthermore, the R3 value may be obtained by reflecting the wheelbase Td, which is set to the initial value in the trailer 3, to the above value R2. The equation for obtaining the value R3 is illustrated in Equation 3 below.

$$R3 = \sqrt{R2^2 + Pd^2 - Td^2} \quad \text{[Equation 3]}$$

In Equation 3 above, Pd denotes the distance from the rear wheel axis B of the vehicle 1 to the pivot point P; Td denotes the distance (the wheelbase value of a trailer) between the wheel axis C of the trailer 3, which is a virtual setting value, and the pivot point P.

The vehicle model hitch angle prediction device 130 may obtain a hitch angle $\theta_{km}$ of the trailer 3 by reflecting R2 and R3 to the kinematic equation. The kinematic equation for obtaining a vehicle model-based hitch angle $\theta_{km}$ is illustrated in following Equation 4.

$$\theta_{km} = \tan^{-1}\frac{P_d}{R2} + \tan^{-1}\frac{T_f}{R3} \quad \text{[Equation 4]}$$

The vehicle model hitch angle prediction device 130 may calculate a vehicle model hitch angle again, when a update signal UPDATE is received from a calculation device 162. For example, the vehicle model hitch angle may be calculated again depending on the updated parameter "Td", when the difference value between two hitch angles $\theta_{km}$ and $\theta_{US}$ ($\theta_{US}$ will be described) is not less than a specific value.

Figure 7:
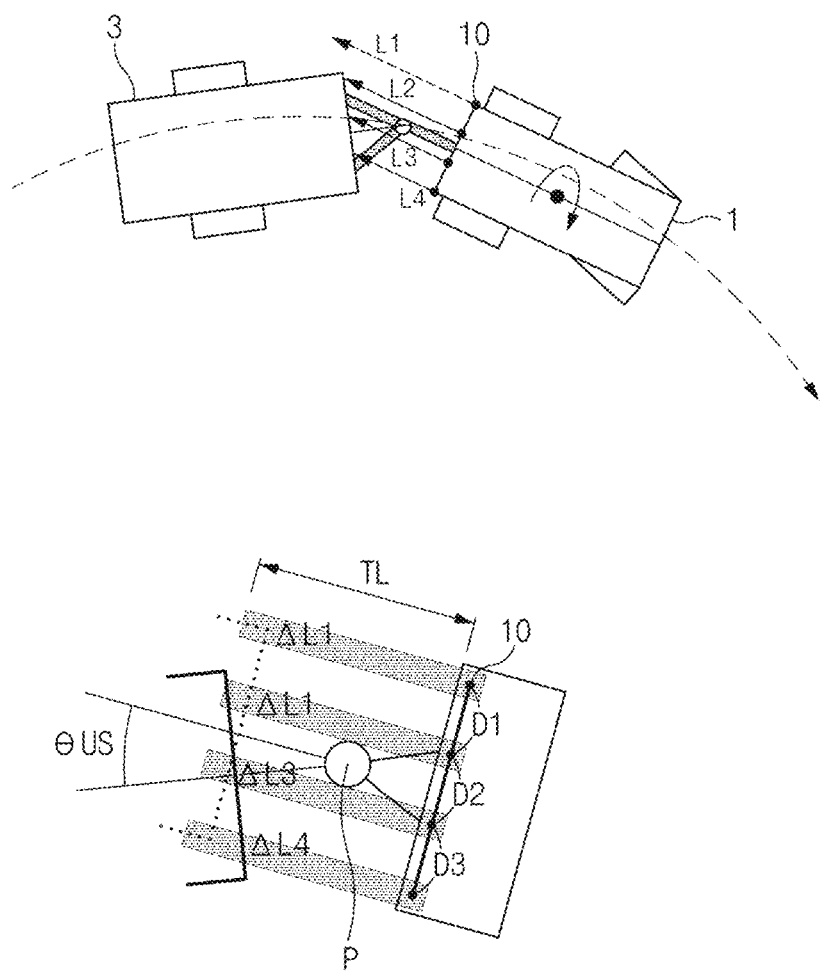
FIG. 7 is a view for describing an ultrasonic sensor hitch angle prediction device of FIG. 2.

FIG. 7 is a view for describing the ultrasonic sensor hitch angle prediction device 140 of FIG. 2.

Referring to FIG. 7, the ultrasonic sensor hitch angle prediction device 140 predicts the angle (hitch angle) between the trailer 3 and the vehicle 1, based on the ultrasonic sensor 10.

The hitch angle $\theta_{US}$ may be calculated based on the distance TL of the layout of the trailer 3 calculated in FIG. 5 and the current distance values L1 to L4 measured by the ultrasonic sensor 10. The equation for calculating the hitch angle $\theta_{US}$ is illustrated in Equation 5 to Equation 7 below.

$$\theta_{US1} = \tan^{-1}\frac{\Delta L1 - \Delta L2}{D1} \quad \text{[Equation 5]}$$

$$\theta_{US2} = \tan^{-1}\frac{\Delta L2 - \Delta L3}{D1} \quad \text{[Equation 6]}$$

$$\theta_{US3} = \tan^{-1}\frac{\Delta L3 - \Delta L4}{D1} \quad \text{[Equation 7]}$$

The controller 100 receives the distance values L1 to L4 between the vehicle 1 and the trailer 3, from the ultrasonic sensor 10. The change values $\Delta L1$ to $\Delta L4$ are respectively defined as the difference between the distance TL of the layout of the trailer 3 and the distance values L1 to L4 measured by the ultrasonic sensor 10, when the vehicle 1 turns at the same radius as the radius illustrated in FIG. 7. Moreover, hitch angles $\theta_{US1}$ to $\theta_{US3}$ changed may be calculated using the distance values D1 to D3 between fixed points of the ultrasonic sensor 10, respectively.

Referring to Equation 5 to Equation 7 above, the changed hitch angles $\theta_{US1}$ to $\theta_{US3}$ may be obtained by calculating the distance values D1 to D3 between fixed points of the ultrasonic sensor 10 and the calculated change values $\Delta L1$ to $\Delta L4$.

$$\theta_{US} = \frac{\sum_{i=1}^{n}\theta_{US_i}}{n} \quad \text{[Equation 8]}$$

In addition, as illustrated in Equation 8 above, the final hitch angle $\theta_{US}$ is calculated by averaging the hitch angles $\theta_{US1}$ to $\theta_{US3}$ respectively changed depending on the distance values D1 to D3. Herein, the distance value L1 or the distance value L4 may not be measured depending on the radius of turn of the vehicle 1. In this case, the final hitch angle $\theta_{US}$ of the trailer 3 is calculated by averaging the remaining hitch angles other than the corresponding value (the unmeasured distance value).

Figure 8:
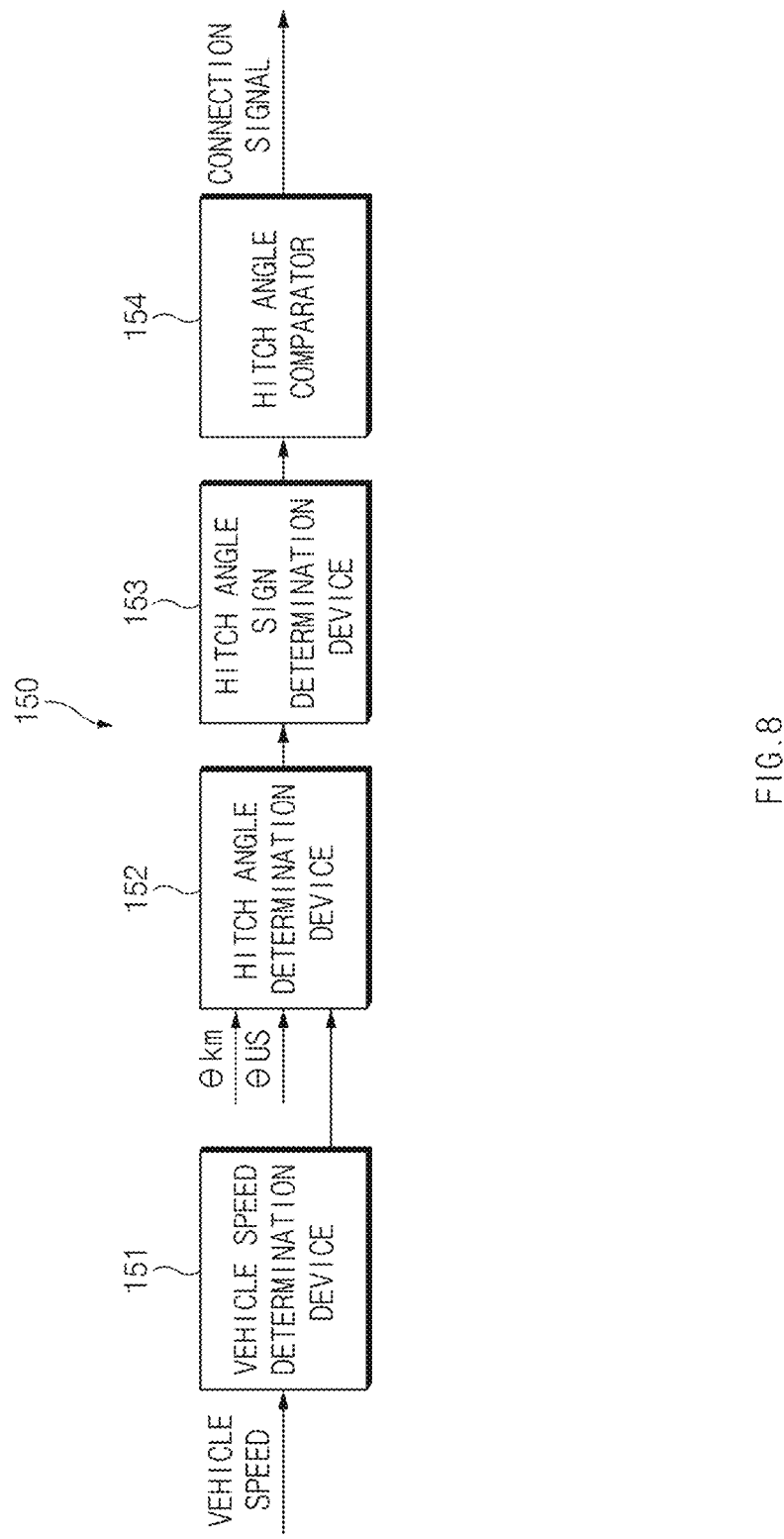
FIG. 8 is a detailed block diagram of a hitch angle matching device of FIG. 2.

FIG. 8 is a detailed block diagram of the hitch angle matching device 150 of FIG. 2.

Referring to FIG. 8, the hitch angle matching device 150 includes a vehicle speed determination device 151, a hitch angle determination device 152, a hitch angle sign determination device 153, and a hitch angle comparator 154.

Herein, the vehicle speed determination device 151 may detect a vehicle speed to determine whether the vehicle 1 is in a reliability situation. That is, whether the speed of a vehicle is not greater than a specific value is determined to improve the reliability of the distance value measured by the ultrasonic sensor 10 and the reliability of a kinematic vehicle model.

For example, the distance value of the ultrasonic sensor 10 may be distorted and the reliability of the kinematic vehicle model may deteriorate, in a state where the speed of the vehicle 1 is a middle-speed or high-speed. Accordingly, the vehicle speed determination device 151 determines that the vehicle 1 is within a reliability range to transmit a matching start signal to the hitch angle determination device 152, when the vehicle speed is not greater than a specific speed (low-speed).

The hitch angle determination device 152 determines a range of a hitch angle upon activating the matching start signal. The hitch angle determination device 152 determines whether the hitch angle $\theta^{km}$ applied from the vehicle model hitch angle prediction device 130 and the hitch angle θUS applied from the ultrasonic sensor hitch angle prediction device 140 are included in a specific range.

The hitch angle determination device 152 determines that the vehicle 1 continuously goes straight, when the two hitch angles $\theta^{km}$ and θUS are included in the specific range. That is, the hitch angle determination device 152 determines that this section is a section in which the hitch angle of the vehicle 1 is not nearly changed, when the two hitch angles $\theta_{km}$ and θUS are included in the specific range. As such, the hitch angle determination device 152 applies this section as a dead zone, thereby preventing the hitch angle from being determined frequently.

Moreover, the hitch angle sign determination device 153 determines whether the signs of the two hitch angles $\theta^{km}$ and θUS to which the dead zone is applied by the hitch angle determination device 152, are the same as each other. The hitch angle sign determination device 153 outputs a matching signal to the hitch angle comparator 154, when the two hitch angles $\theta^{km}$ and θUS are the same as each other.

In addition, the hitch angle comparator 154 compares the difference value between the two hitch angles $\theta_{km}$ and θUS, when the matching signal is applied from the hitch angle sign determination device 153. The hitch angle comparator 154 determines that the trailer 3 is connected and then activates a connection signal, when the difference value between the two hitch angles $\theta^{km}$ and θUS is not greater than the specific value.

Figure 9:
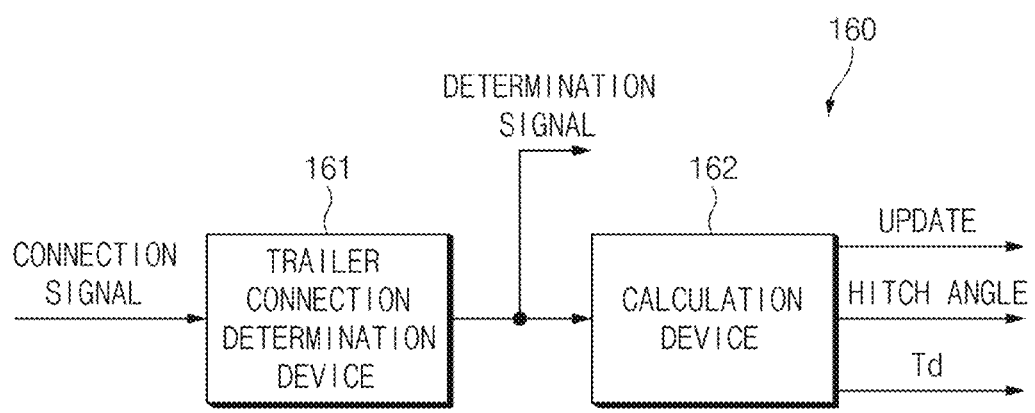
FIG. 9 is a detailed block diagram of a trailer determination device of FIG. 2.

FIG. 9 is a detailed block diagram of the trailer determination device 160 of FIG. 2.

The trailer determination device 160 includes a trailer connection determination device 161 and the calculation device 162.

Herein, the trailer connection determination device 161 finally determines whether an object mounted in the vehicle 1 is the trailer 3, in response to the connection signal applied from the hitch angle comparator 154.

The trailer connection determination device 161 determines that the trailer 3 is finally connected to the vehicle 1, when the connection signal applied from the hitch angle comparator 154 is maintained in an activation state during a specific time. The trailer connection determination device 161 may output a determination signal to the reset device 170 and the trailer mode controller 200, when the trailer 3 is connected.

The calculation device 162 determines whether the signs of the two hitch angles $\theta^{km}$ and θUS are the same as each other but the difference value is not less than a specific value. For example, the calculation device 162 transmits a signal UPDATE for updating the value (the wheelbase value of a trailer) of parameter "Td" described in FIG. 6, to the vehicle model hitch angle prediction device 130, when the difference value of the two hitch angles $\theta^{km}$ and θUS is not less than the specific value.

Furthermore, the calculation device 162 may decrease the value of parameter "Td" when a vehicle model hitch angle is great by a specific value or more and may increase the value of parameter "Td" when a vehicle model hitch angle is small by the specific value or more.

Moreover, the calculation device 162 may transmit the hitch angle value to the trailer mode controller 200, when the difference value of the two hitch angles $\theta^{km}$ and θUS is maintained less than or equal to the specific value during a specific time.

Figure 10A:
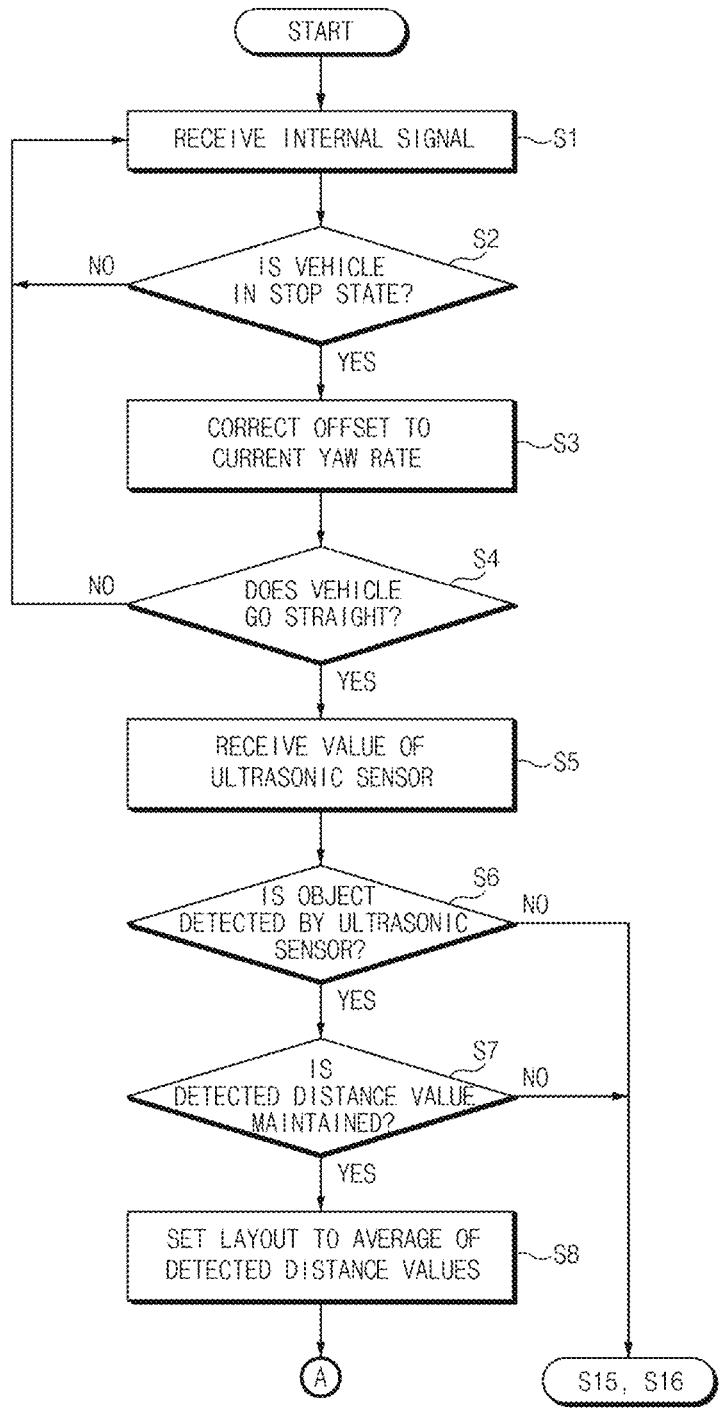
FIGS. 10A and 10B are flowcharts of a trailer recognition method of a vehicle, according to another exemplary embodiment of the present disclosure.
Figure 10B:
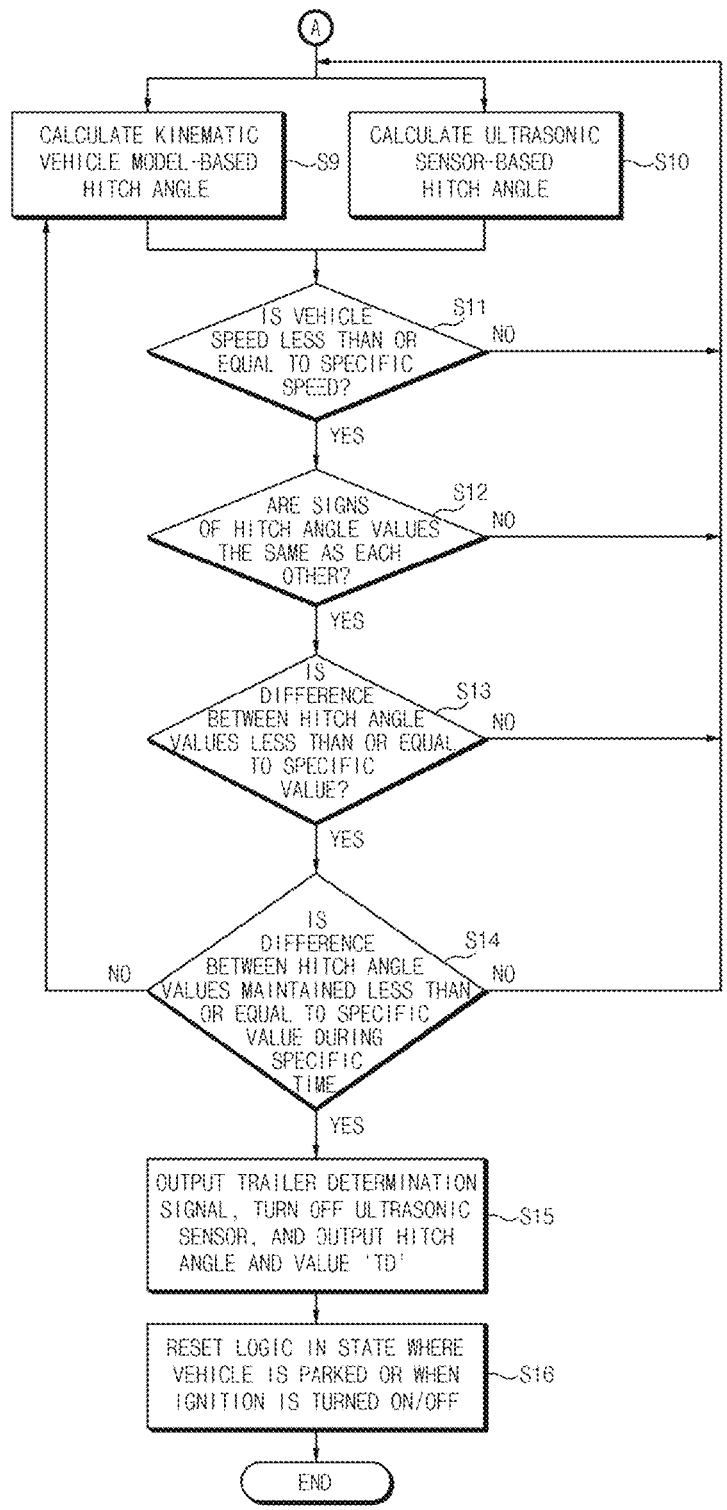

FIGS. 10A and 10B are flowcharts of a trailer recognition method of a vehicle, according to another exemplary embodiment of the present disclosure.

Referring to FIG. 10A, in operation S1, the offset correction device 110 receives an internal signal such as a steering angle, a yaw rate, a vehicle speed, or the like from the communicator 11. In operation S2, the stop state determination device 111 determines whether the vehicle 1 is in a stop state. The procedure proceeds to operation S1, when the vehicle 1 is not in the stop state in operation S2. On the other hand, in operation S3, the yaw rate correction device 112 corrects the yaw rate offset to the current yaw rate value, when the vehicle 1 is in the stop state.

Afterward, in operation S4, the go-straight determination device 114 determines whether the vehicle 1 goes straight. The procedure proceeds to operation S1, when the vehicle 1 does not go straight in operation S4. On the other hand, in operation S5, the controller 100 receives a distance value from the ultrasonic sensor 10 when the vehicle 1 goes straight.

The ultrasonic sensor 10 is turned on, when it is determined that the vehicle 1 goes straight. As such, in operation S6, the rear object detection device 120 receives a distance value from the ultrasonic sensor 10 to determine whether an object is detected at the rear of the vehicle 1. In operation S7, the rear object detection device 120 determines whether the difference between the previously measured distance value and the current distance value L1, L2, L3, or L4 sensed from the ultrasonic sensor 10 is maintained less than or equal to a specific value.

The procedure proceeds to operation S15 and operation S16 and then the ultrasonic sensor 10 is turned off, when an object is not detected at the rear of the vehicle 1 in operation S6 or when the difference of the distance value is not maintained less than or equal to the specific value in operation S7.

On the other hand, in operation S8, the rear object detection device 120 averages the detected distance values to set the averaged value to the distance TL of the layout of the trailer 3, when the distance value is maintained less than or equal to the specific value after an object is detected at the rear of the vehicle 1.

Referring to FIG. 10B, in operation S9, the vehicle model hitch angle prediction device 130 predicts a kinematic vehicle model-based hitch angle, in response to the internal signal of the vehicle 1. Moreover, in operation S10, the ultrasonic sensor hitch angle prediction device 140 predicts a hitch angle based on the distance value of the ultrasonic sensor 10.

Afterward, in operation S11, the vehicle speed determination device 151 determines whether the current vehicle speed of the vehicle 1 is not greater than a specific speed to ensure the reliability of each of the hitch angles. The procedure proceeds to operation S9 and operation S10, when the vehicle speed is not less than the specific value. On the other hand, in operation S12, the hitch angle sign determination device 153 determines signs of two hitch angle values measured by the vehicle model hitch angle prediction device 130 and the ultrasonic sensor hitch angle prediction device 140 are the same as each other, when the vehicle speed of the vehicle 1 is not less than the specific speed.

In operation S13, the hitch angle comparator 154 determines whether the difference between the two hitch angle values is not greater than a specific value, when the signs of the two hitch angle values are the same as each other. The procedure proceeds to operation S9 and operation S10, when the difference between the two hitch angle values is not less than the specific value. On the other hand, in operation S14, the trailer connection determination device 161 determines whether the difference between the two hitch angle values is maintained less than or equal to the specific value during a specific time, when the difference between the two hitch angle values is not greater than the specific value.

The procedure proceeds to operation S9 and operation S10, when the difference between the two hitch angle values is not maintained less than or equal to the specific value. Furthermore, in operation S9, the vehicle model hitch angle prediction device 130 calculates a hitch angle again depending on the updated trailer wheelbase value Td.

On the other hand, a determination signal indicating whether a trailer is finally connected is output, when the difference between the two hitch angle values is maintained less than or equal to the specific value in operation S14. In addition, in operation S15, the hitch angle value calculated by the calculation device 162 is transmitted to the trailer mode controller 200 and the ultrasonic sensor 10 is turned off. Afterward, in operation S16, the reset device 170 resets the logic of the controller 100, in a state where the vehicle 1 is parked or when the ignition is turned on/off.

Figure 11:
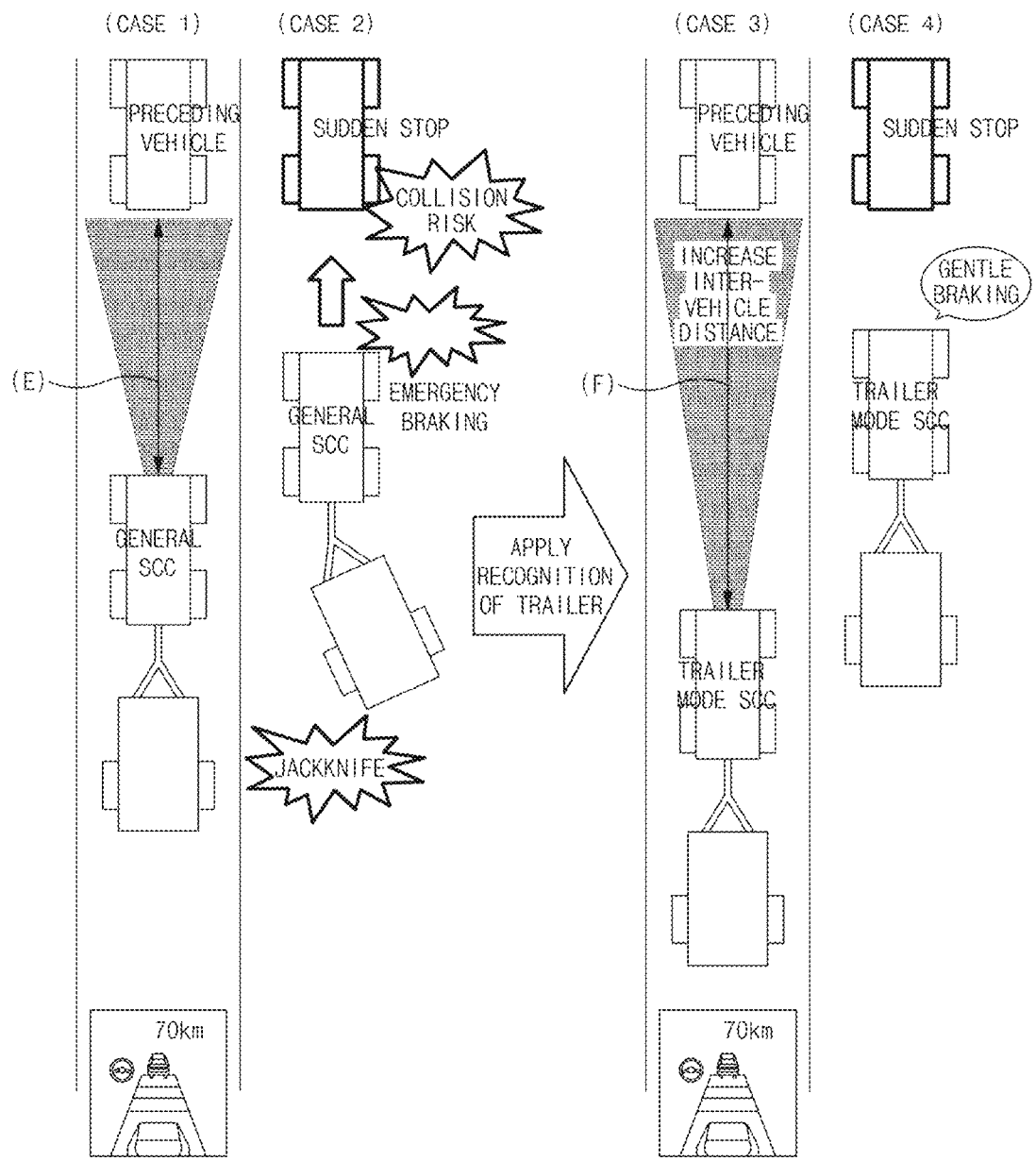
FIGS. 11 to 14 are views for describing an example in which a trailer mode controller 200 of FIG. 2 is applied.

FIG. 11 is an embodiment for describing an example in which the trailer mode controller 200 of FIG. 2 is applied.

The Advanced Driver Assistance System (ADAS), which provides a driver with more convenience and safety functions, has been recently applied to produced vehicles in various forms.

The ADAS may include a Smart Cruise Control (SCC) module that performs autonomous driving by detecting the driving information of the preceding vehicle in the driving environment information to automatically accelerate or decelerate the host vehicle depending on the detected driving information of the preceding vehicle.

A general SCC module does not have a separate mode depending on whether a trailer is towed. For this reason, the inter-vehicle distance and the speed of a vehicle, which are set by the driver may make the behavior of the vehicle unstable and dangerous.

In an embodiment of the present disclosure, whether the trailer is towed may be actively determined by applying the above-described FIGS. 1 to 10B. Accordingly, whether the trailer is towed may be considered during the operation of the SCC module. For example, the trailer mode controller 200 according to an embodiment of the present disclosure may increase a setting distance for each level of the inter-vehicle distance depending on the determination result of the controller 100 and may allow the limited speed of a vehicle to be set actively.

The inter-vehicle distance during an operation of the SCC module needs to ensure the braking distance according to the current speed of a vehicle. However, in the case of a vehicle equipped with a trailer, the braking distance may increase. In addition, a jackknife phenomenon (a phenomenon that a trailer collides with the tow vehicle as inertia progresses) may occur when a sudden braking force is input even when a vehicle is turned slowly (refer to cases 1 and 2).

Accordingly, the trailer mode controller 200 according to an embodiment of the present disclosure may set the braking distance to be ensured sufficiently, when it is determined that the trailer is connected to the vehicle. For example, the SCC module may applies (F) a fixed multiple to the initial setting point 'E' of the inter-vehicle distance level set by the driver such that the inter-vehicle distance is adjusted (refer to case 3 and case 4).

In the meantime, the ADAS may include a Forward Collision Avoidance (FCA) system that determines the risk of collision with an opposing vehicle or a crossing vehicle in the driving situation of the vehicle and avoids the collision through emergency braking in the collision situation. The trailer may lose the stability and may lead to a serious accident as illustrated in case 2, when a vehicle equipped with a trailer is driving at high speed.

The trailer mode controller 200 according to an embodiment of the present disclosure may actively change a boundary value to a value corresponding to a long distance, when the FCA system detects a forward collision situation. The embodiment of the present disclosure may implement safe driving by limiting the maximum speed of the vehicle, as illustrated in case 4.

Figure 12:
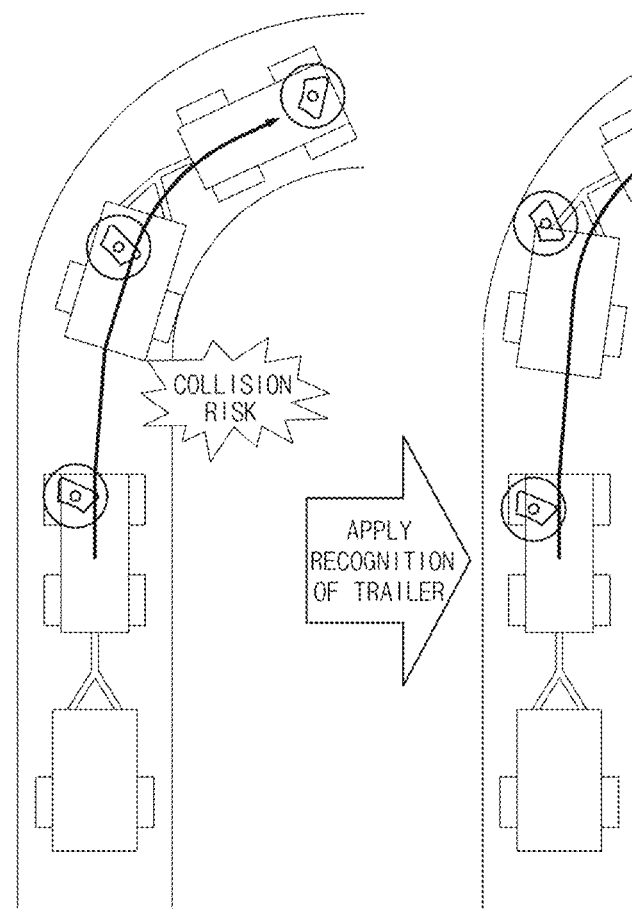
Figure 12:
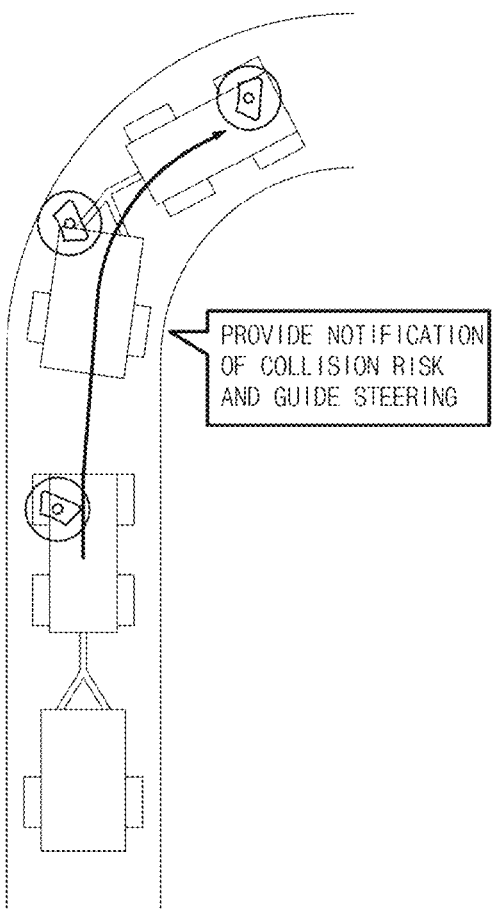

FIG. 12 is another embodiment for describing an example in which the trailer mode controller 200 of FIG. 2 is applied.

The trailer connected to the rear of a vehicle is likely to collide with the surrounding obstacle when a vehicle towing the trailer is turning and thus a major accident may occur (refer to case 5).

In an embodiment of the present disclosure, whether the trailer is present may be actively determined by applying the above-described FIGS. 1 to 10B. As such, the trailer mode controller 200 according to an embodiment of the present disclosure may notify a driver of the turnable trajectory of the vehicle upon entering a trailer mode, thereby preventing the collision with obstacles or other vehicles.

For example, in an embodiment of the present disclosure, it may be possible to recognize the curvature of the forward rotation, the width of a vehicle, a guard rail (lateral obstacles or load boundary), or the like, by using a front camera mounted in the vehicle and map information.

The trailer mode controller 200 according to an embodiment of the present disclosure may predict the possibility of collision according to the driving route of the vehicle from the hitch angle between the vehicle and the trailer output from the controller 100 and the estimated value 'Td' of the wheelbase of the trailer (In the case of the width of the trailer, it is possible to follow the specification of the trailer). The trailer mode controller 200 may predict collision possibility of the vehicle to allow the driver to recognize the collision possibility and then may notify the driver that the driver may drive the vehicle at a greater turning radius.

Figure 13:
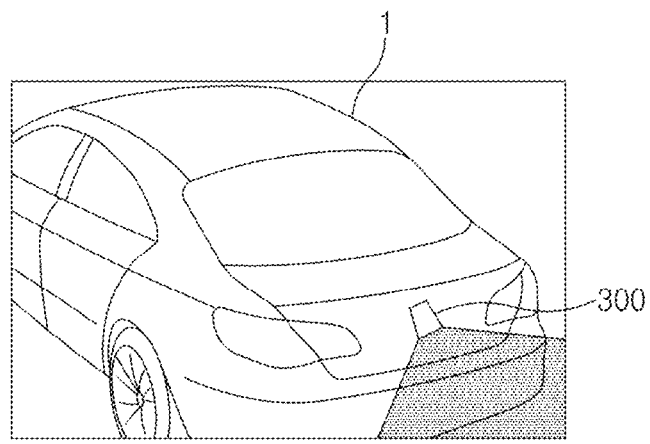

FIG. 13 is still another exemplary embodiment for describing an example in which the trailer mode controller 200 of FIG. 2 is applied.

Referring to FIG. 13, a rear object may be detected using image information of a rear camera 300 when the rear camera 300 is present in the vehicle 1.

The trailer mode controller 200 according to an exemplary embodiment of the present disclosure may track the movement of the layout of an object detected by the rear camera 300 in the turning direction, thereby enhancing the reliability of the driving stability.

Figure 14:
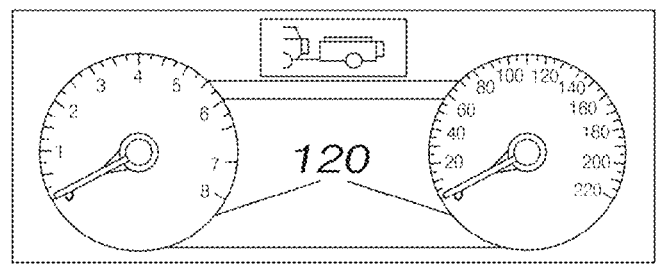

FIG. 14 is yet another exemplary embodiment for describing an example in which the trailer mode controller 200 of FIG. 2 is applied.

Referring to FIG. 14, the trailer mode controller 200 may indicate whether a trailer is towed, on a cluster screen such that a driver may select a vehicle mode based on whether the trailer is present.

For example, the trailer mode controller 200 may actively determine a trailer traction mode even when the driver does not manually select a trailer mode. As such, in an embodiment of the present disclosure, it may be possible to activate various functions to prevent damage in the dangerous situation of a vehicle, by recommending the driver to activate the trailer mode.

Those skilled in the art to which the present disclosure pertains may be embodied in other specific forms without changing the technical ideas or necessary features, and thus it should be understood that the above-described embodiments are illustrative in all aspects and not restrictive. The scope of the present disclosure is defined by claims to be described rather than the detailed description, and it should be interpreted that the scopes or claims of the present disclosure and all modifications or changed forms derived from the equivalent concept are included in the scopes of the present disclosure.

In an exemplary embodiment of the present disclosure, it is possible to actively determine whether a trailer is mounted, by recognizing a trailer through the prediction of a hitch angle of a vehicle model and a hitch angle of an ultrasonic sensor.

In addition, the embodiment of the present disclosure is for illustrative purposes, it will be understood by those skilled in the art that various modifications, additions, and substitutions are possible without departing from the spirit and scope of the present disclosure and these modifications and the like belong to the following claims.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A trailer recognizing device of a vehicle, the device comprising:
a sensor configured to sense a distance value between the vehicle and a rear object;
a controller configured to:
receive the distance value from the sensor in a go-straight state of the vehicle to determine whether the rear object is detected,
predict a first hitch angle based on a vehicle model and a second hitch angle based on the distance value, and
match the first hitch angle with the second hitch angle to determine whether the trailer is connected; and
a trailer mode controller configured to control a trailer mode of the vehicle, when it is determined that the trailer is connected.

2. The trailer recognizing device of claim 1, wherein the controller includes:
an offset correction device configured to receive an internal signal to correct a yaw rate offset;
a rear object detection device configured to detect the rear object;
a vehicle model hitch angle prediction device configured to predict the first hitch angle based on the vehicle model;
a sensor hitch angle prediction device configured to predict the second hitch angle based on the sensor;
a hitch angle matching device configured to match the first hitch angle with the second hitch angle; and
a trailer determination device configured to:
determine whether the trailer is connected in response to an output of the hitch angle matching device, and
generate the control signal.

3. The trailer recognizing device of claim 2, wherein the offset correction device includes:
a stop state determination device configured to determine whether the vehicle is a stop state, in response to the internal signal;
a yaw rate correction device configured to apply a first yaw rate value at a point in time when the vehicle is in the stop state to correct the yaw rate offset;
a yaw rate calculation device configured to calculate a second yaw rate value based on the vehicle model; and
a go-straight determination device configured to determine whether the vehicle moves straight.

4. The trailer recognizing device of claim 3, wherein the yaw rate calculation device is configured to calculate the second yaw rate value based on a two-degree-of-freedom vehicle model.

5. The trailer recognizing device of claim 3, wherein the go-straight determination device is configured to:
compare the first yaw rate value corrected by the yaw rate correction device with the second yaw rate value calculated by the yaw rate calculation device, and
determine that the vehicle moves straight when each of the first and second yaw rate values is within a specific value.

6. The trailer recognizing device of claim 3, wherein the rear object detection device is configured to receive the distance value from the sensor when a determination result of the go-straight determination device indicates that the vehicle moves straight.

7. The trailer recognizing device of claim 2, wherein the rear object detection device is configured to average distance values to set a distance of a trailer layout, when a difference between a previously measured distance value and the distance value is maintained less than or equal to a specific value.

8. The trailer recognizing device of claim 2, wherein the vehicle model hitch angle prediction device is configured to:
predict a radius of turn, using a kinematic vehicle model, and
calculate the first hitch angle by reflecting a wheelbase value of the trailer.

9. The trailer recognizing device of claim 2, wherein the vehicle model hitch angle prediction device is configured to calculate a hitch angle again by reflecting an updated wheelbase value of a trailer, when an update signal is received from the trailer determination device.

10. The trailer recognizing device of claim 2, wherein the trailer determination device is configured to output an update signal for updating a wheelbase value of the trailer, to the vehicle model hitch angle prediction device, when a difference value between the first hitch angle and the second hitch angle is not less than a specific value.

11. The trailer recognizing device of claim 2, wherein the sensor hitch angle prediction device is configured to:
define a change value as a difference of a distance of a trailer layout set by the rear object detection device, and
calculate a hitch angle changed using the distance value.

12. The trailer recognizing device of claim 11, wherein the sensor hitch angle prediction device is configured to:
calculate a distance value between fixed points of the sensor and the calculated change value, and
average hitch angles, which are changed, to calculate the second hitch angle.

13. The trailer recognizing device of claim 12, wherein the sensor hitch angle prediction device is configured to:
average remaining hitch angles other than an unmeasured distance value of the distance value to calculate the second hitch angle.

14. The trailer recognizing device of claim 2, wherein the hitch angle matching device includes:
a vehicle speed determination device configured to determine whether a vehicle speed of the vehicle is not greater than a specific speed;
a hitch angle determination device configured to determine whether the first hitch angle and the second hitch angle are within a specific range, to apply a dead zone in a go-straight state of the vehicle;
a hitch angle sign determination device configured to determine whether signs of the first hitch angle and the second hitch angle are the same; and
a hitch angle comparator configured to compare a difference value between the first hitch angle and the second hitch angle.

15. The trailer recognizing device of claim 14, wherein the hitch angle comparator is configured to determine that the trailer is connected to activate a connection signal, when the difference value between the first hitch angle and the second hitch angle is not greater than a specific value.

16. The trailer recognizing device of claim 2, wherein the controller further includes a reset device configured to control whether to reset the sensor and the controller in response to an output of the trailer determination device and the rear object detection device.

17. A trailer recognizing method of a vehicle, the method comprising:
receiving a distance value from a sensor in a go-straight state of the vehicle to determine whether an object is detected at a rear side of the vehicle;
predicting a first hitch angle based on a vehicle model and predicting a second hitch angle based on the distance value;
matching the first hitch angle with the second hitch angle to determine whether the trailer is connected; and
controlling a trailer mode of the vehicle, when it is determined that the trailer is connected.

18. The method of claim 17, wherein the receiving a distance value includes:
receiving an internal signal of the vehicle to correct a yaw rate offset when the vehicle is in a stop state; and
averaging distance values to set the averaged distance value to a distance of a trailer layout, when a difference between a previously measured distance value and the distance value sensed by the sensor is maintained less than or equal to a specific value.

19. The method of claim 17, wherein the matching the first hitch angle includes:
determining whether signs of the first hitch angle and the second hitch angle are the same when a vehicle speed of the vehicle is not greater than a specific speed; and
determining that the trailer is connected, when a difference of the two hitch angle values is maintained for a specific period of time to be less than or equal to a specific value when the difference of the two hitch angle values is not greater than the specific value.

* * * * *